(12) United States Patent
Villamagna

(10) Patent No.: US 9,393,519 B2
(45) Date of Patent: Jul. 19, 2016

(54) WASTE DISPOSAL

(71) Applicant: Strategic Environmental & Energy Resources, Inc., Commerce City, CO (US)

(72) Inventor: Fortunato Villamagna, Las Vegas, NV (US)

(73) Assignee: Strategic Environmental & Energy Resources, Inc., Golden, CO (US)

( * ) Notice: Subject to any disclaimer, the term of this patent is extended or adjusted under 35 U.S.C. 154(b) by 0 days.

(21) Appl. No.: 14/523,666

(22) Filed: Oct. 24, 2014

(65) Prior Publication Data

US 2015/0044115 A1 Feb. 12, 2015

Related U.S. Application Data

(63) Continuation of application No. 13/782,877, filed on Mar. 1, 2013, now Pat. No. 8,870,735.

(60) Provisional application No. 61/648,377, filed on May 17, 2012.

(51) Int. Cl.
*A62D 3/19* (2007.01)
*B01D 53/30* (2006.01)
*B01D 53/76* (2006.01)
*B09B 3/00* (2006.01)

(52) U.S. Cl.
CPC ........ *B01D 53/76* (2013.01); *A62D 3/19* (2013.01); *B01D 53/30* (2013.01); *B01D 2259/818* (2013.01); *Y10S 423/10* (2013.01); *Y10S 588/90* (2013.01)

(58) Field of Classification Search
CPC ........ B01D 53/007; B09B 3/00; B09B 3/0075; A62D 3/19; A62D 2101/20
See application file for complete search history.

(56) References Cited

U.S. PATENT DOCUMENTS

| | | | |
|---|---|---|---|
| 3,791,796 A | 2/1974 | Gamble et al. | |
| 5,750,823 A * | 5/1998 | Wofford | B01D 53/32 423/210 |
| 5,993,761 A | 11/1999 | Czernichowski et al. | |
| 6,007,742 A | 12/1999 | Czernichowski et al. | |
| 6,524,538 B2 * | 2/2003 | Barankova | B01D 53/32 204/164 |
| H002102 H | 5/2004 | Uhm | |
| 6,924,608 B2 | 8/2005 | Czernichowski et al. | |

(Continued)

FOREIGN PATENT DOCUMENTS

| | | |
|---|---|---|
| CN | 202087223 U | 12/2011 |
| CN | 202315702 U | 7/2012 |

(Continued)

OTHER PUBLICATIONS

International Searching Authority, U.S. Patent and Trademark Office, International Search Report for PCT/US2014/019300, mailed Aug. 7, 2014, 3 pages.

(Continued)

*Primary Examiner* — Timothy Vanoy
(74) *Attorney, Agent, or Firm* — HolzerIPLaw, PC

(57) ABSTRACT

The waste disposal system disclosed herein includes a chamber operated at high ampere and low voltage, the chamber configured to inject smoke on a stream of free radicals. In one implementation, the stream of free radicals is generated from a plasma igniter and the smoke is generated from waste products, such as hospital waste products.

19 Claims, 11 Drawing Sheets

(56) References Cited

U.S. PATENT DOCUMENTS

| | | |
|---|---|---|
| 7,417,385 B2 | 8/2008 | Czernichowski et al. |
| 7,459,594 B2 | 12/2008 | Czernichowski et al. |
| 8,460,409 B2 | 6/2013 | Hartvigsen et al. |
| 8,529,855 B2 | 9/2013 | Chew |
| 8,580,087 B2 | 11/2013 | Ogut et al. |
| 8,667,914 B2 | 3/2014 | Chapman et al. |
| 2002/0040889 A1 | 4/2002 | Markunas et al. |
| 2002/0134666 A1 | 9/2002 | Hemingway et al. |
| 2002/0153241 A1 | 10/2002 | Niv et al. |
| 2004/0195088 A1* | 10/2004 | Rostaing .............. B01D 53/323 204/164 |
| 2005/0023128 A1 | 2/2005 | Keras et al. |
| 2007/0196249 A1 | 8/2007 | Fridman et al. |
| 2007/0259228 A1 | 11/2007 | Hartvigsen et al. |
| 2008/0056961 A1 | 3/2008 | Matveev |
| 2008/0060935 A1 | 3/2008 | Hartvigsen |
| 2008/0148636 A1 | 6/2008 | Hartvigsen et al. |
| 2008/0245749 A1 | 10/2008 | Matveev |
| 2008/0247904 A1* | 10/2008 | Paskalov ................. A61L 11/00 422/22 |
| 2009/0050713 A1 | 2/2009 | Matveev |
| 2009/0056604 A1 | 3/2009 | Hartvigsen et al. |
| 2009/0181274 A1 | 7/2009 | Elangovan et al. |
| 2009/0196810 A1 | 8/2009 | Joshi |
| 2009/0223806 A1* | 9/2009 | Thevenet ............... B01D 53/32 204/157.3 |
| 2010/0279194 A1 | 11/2010 | Elangovan et al. |
| 2010/0319535 A1 | 12/2010 | Joshi et al. |
| 2011/0250098 A1 | 10/2011 | Matveev |
| 2012/0020844 A1 | 1/2012 | Foret |
| 2012/0024718 A1 | 2/2012 | Foret |
| 2012/0036829 A1 | 2/2012 | Foret |
| 2013/0131421 A1 | 5/2013 | Stein et al. |
| 2014/0037522 A1 | 2/2014 | Hauville et al. |

FOREIGN PATENT DOCUMENTS

| | | |
|---|---|---|
| DE | 3535873 A1 | 4/1987 |
| JP | 58133817 A | 8/1983 |
| JP | 6349604 A | 3/1988 |
| JP | 63315819 A | 12/1988 |
| JP | 2000245862 A | 9/2000 |
| RU | 2106183 C1 | 3/1998 |

OTHER PUBLICATIONS

International Searching Authority, U.S. Patent and Trademark Office, Written Option for PCT/US2014/019300, mailed Aug. 7, 2014, 3 pages.

* cited by examiner

WASTE DISPOSAL

CROSS-REFERENCE TO RELATED APPLICATIONS

This application claims benefit and priority of U.S. patent application Ser. No. 13/782,877, filed on 1 Mar. 2013, and entitled "WASTE DISPOSAL," which is now U.S. Pat. No. 8,870,735, which claims benefit and priority of U.S. Provisional Application Ser. No. 61/648,377, filed on 17 May 2012, entitled "WASTE DISPOSAL," of which both are specifically incorporated herein by reference for all that they disclose or teach.

FIELD

Implementations disclosed herein relate, in general, to information methods and systems for disposal of waste.

DISCUSSION OF RELATED ART

Waste disposal is a major problem in modern economies. As the consumption of products increase per capita, so does the generation of waste material. Various systems used for waste disposal include household waste disposal systems, industrial waste disposal systems, hospital waste disposal systems, etc. Typical household waste disposal systems include expensive and environmentally unfriendly trucking and landfill operations. Industrial waste from factories, refineries, etc., is generally disposed of using methods that involve burning the waste and generating hothouse gases such as carbon dioxide, methane, etc. These existing waste disposal systems are typically energy inefficient and environmentally unfriendly. Furthermore, due to the composition of the exhaust generated by such existing waste disposal systems, they do not meet various guidelines and requirements of the environmental protection agency (EPA).

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

Implementations of the present technology are disclosed herein in the context of a content management system. In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular implementations, it should be appreciated that the features described with respect to one implementation may be incorporated with other implementations as well. By the same token, however, no single feature or features of any described implementation should be considered essential to the invention, as other implementations of the invention may omit such features.

In the interest of clarity, not all of the routine functions of the implementations described herein are shown and described. It will, of course, be appreciated that in the development of any such actual implementation, numerous implementation-specific decisions should be made in order to achieve the developer's specific goals, such as compliance with application—and business-related constraints, and that those specific goals will vary from one implementation to another and from one developer to another.

A waste disposal system disclosed herein converts waste products into benign and useful output. An example implementation of the waste disposal system provides for converting waste products into smoke and injecting the smoke into a stream of free radicals. The stream of free radicals, such as those generated in a low energy or "cold" plasma, reacts with the smoke, initiating a free radical series of reactions that breaks apart the components of the smoke. In an implementation, the waste product is the waste generated in hospitals, such as red bag waste comprising contaminated and hazardous material. In an alternative implementation, the waste product is the waste generated from a refinery, a chemical factory, other industrial facility, etc. The waste disposal system disclosed herein generates output that is environmentally friendly and generally in compliance with various environmental protection agency (EPA) regulations.

Figure 1:
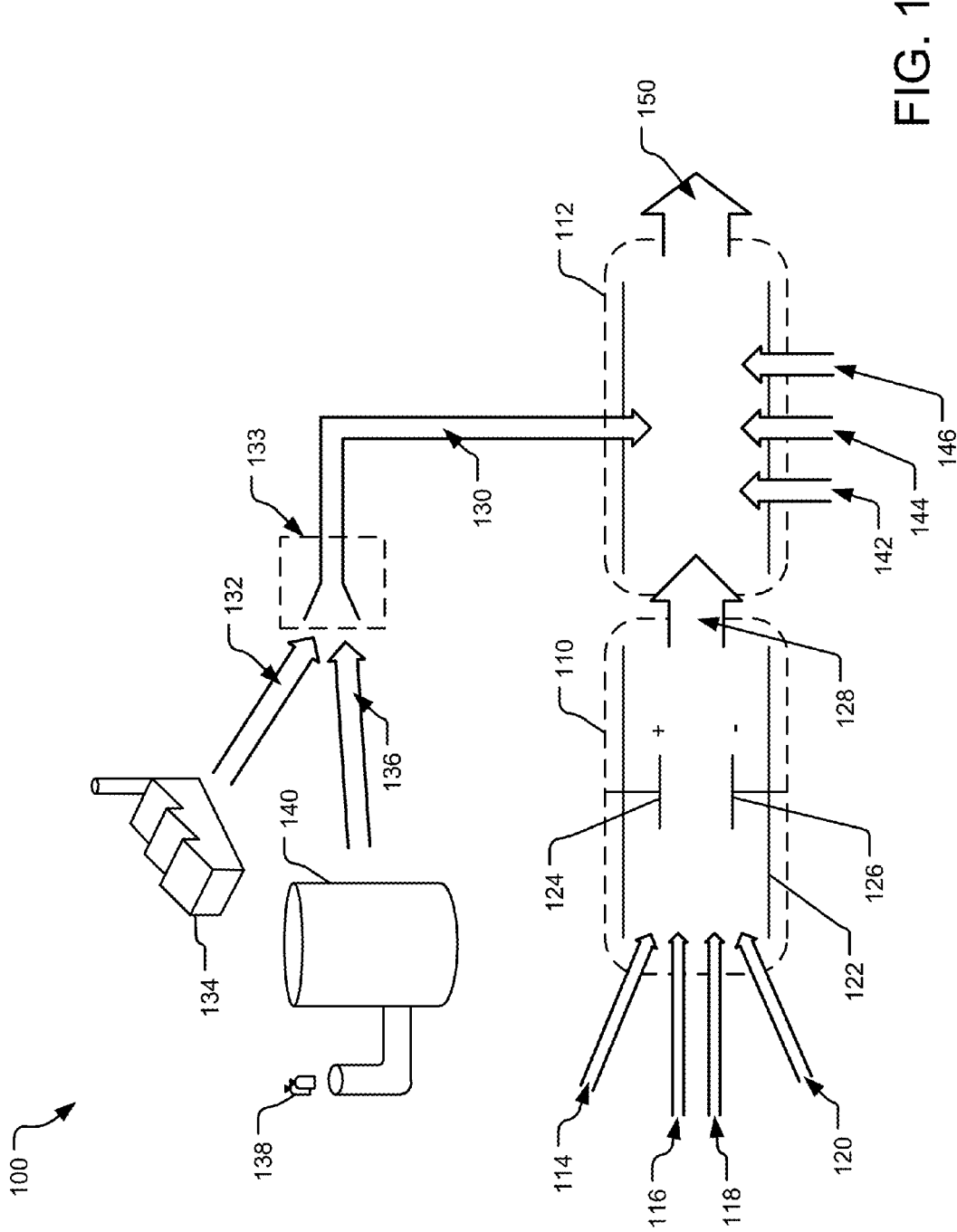
FIG. 1 illustrates a first example block diagram for a waste disposal system.

FIG. 1 illustrates a first example block diagram for a waste disposal system 100 used for disposing waste material. Specifically, the waste disposal system 100 uses the stream generated from a cold plasma source to react with and dispose of the smoke generated by a primary pyrolysis system where the waste material is introduced. One implementation of the waste disposal system 100 includes a primary chamber 110 and a secondary chamber 112. The primary chamber 110 is used to generate cold plasma. While FIG. 1 discloses the primary chamber 110 and the secondary chamber 112 as separate chambers, in an alternate implementation, the primary chamber 110 and the secondary chamber 112 may be implemented as distinct zones in a common reactor. In an alternative implementation, the primary chamber comprises a non-equilibrium non-thermal plasma discharge-system-reactor, with the plasma zone created through microwave systems, dielectric barrier discharges, repetitively pulsed nanosecond discharges, or other similar process.

The term plasma is used herein to refer to a gas consisting of a single compound or a plurality of compounds in which a certain portion of the molecules are ionized. For example, plasma may be generated through a cascade of electrons colliding with gaseous molecules, thus turning the gas into plasma that contains charged particles, positive ions, negative electrons, etc. A plasma is referred to as cold plasma if a small fraction of the gas molecules are ionized. Typically, cold plasma exists at temperatures from room temperature to up to a few thousand degree Celsius or less. In one example implementation, the primary chamber 110 is stoichiometrically controlled based on quantitative relationships between various reactants of the plasma.

The waste disposal system 100 uses the cold plasma generated by the primary chamber 110 to dispose of waste products. In one implementation, smoke generated from waste products is impinged on the cold plasma in the secondary chamber 112 to break the smoke particles apart into environmentally friendly components. Smoke generated from the waste products includes combustible hydrocarbon effluents or combustible carbonaceous affluent. In some situations, smoke comprises aerosol consisting of combustible gas molecules. In alternative situations, the smoke generated from the waste products comprises gaseous molecules, droplets of water, carbonaceous particles, ash, metal components, etc. In one example implementation, the secondary chamber 112 is also stoichiometrically controlled based on quantitative relationships between various reactants of the plasma and the components of the smoke input therein.

The primary chamber 110 includes a plasma igniter 122 having an anode 124 and a cathode 126. In one implementation, the input to the primary chamber includes fuel 114, air 116, steam 118, and inert gas 120. For example, the inert gas includes nitrogen, neon, helium, air, etc. A very high potential is applied between the anode 124 and the cathode 126. For example, potential applied to the plasma igniter may be in the range of 1000 V with a low current in the range of 1 ampere, resulting in low average power in the range of 1000 watts. As the input 114-120 passes through the plasma igniter, various components of the input 114-120 are ionized, generating cold plasma 128 containing stream of radicals, such as H—, OH—, $H_2O_2$, etc. In one implementation, the cold plasma 128 output from the primary chamber 110 is at very high temperature, in the range of 1000 degree Celsius or higher.

The cold plasma 128 is introduced into the secondary chamber 112. The secondary chamber 112 also receives smoke 130. In one implementation of the waste disposal system 100, the smoke 130 is the exhaust gas 132 received from an industrial plant 134, such as a chemical plant, a refinery, etc. In one implementation a system to convert the input to the secondary chamber 112 may be processed by a pyrolysis or other system 133 located at the receiving end of a conduit connected to the secondary chamber 112. Alternatively, the smoke 130 is the output 136 generated by processing waste products 138 using a waste processor 140. For example, the waste products 138 may be bags of waste collected from a hospital, such as the red bag waste from hospitals, containing bio-hazardous material. Alternatively, the waste products 138 are waste products from a chemical processing factory, household waste, etc. The processor 140 coverts the waste products 138 into output 136 that include various gaseous molecules, water droplets, etc.

The secondary chamber 112 also receives steam 142, air 144, and inert gas or a carbon and hydrogen containing (combustible) gas to balance the stoichiometry of the system 146. The location where each of the components is introduced to the secondary chamber 112 and the amount of these components introduced to the secondary chamber 112 is monitored so as to control reactions in the secondary chamber In one implementation, a structure using concentric pipes is used to introduce the cold plasma 128, the smoke 130, the steam 142, the air 144, and the inert gas 146 into the secondary chamber 112. An example implementation of the secondary chamber 112 using the concentric pipes is disclosed in further detail in FIG. 3 below.

Impinging the smoke 130 on the cold plasma 128 causes various reactions resulting in breaking of the components of the smoke 130 into component particles 150. For example, the component particles 150 include hydrogen, oxygen, various metal particles, etc. The composition of the component particles 150 depends on the composition of the waste products 138 used to generate the output 136 or the composition of the exhaust gases 132. In an implementation, one or both of the primary chamber 110 and the secondary chamber 112 are operated using DC power. Yet alternatively, such DC power is pulsed.

Figure 2:
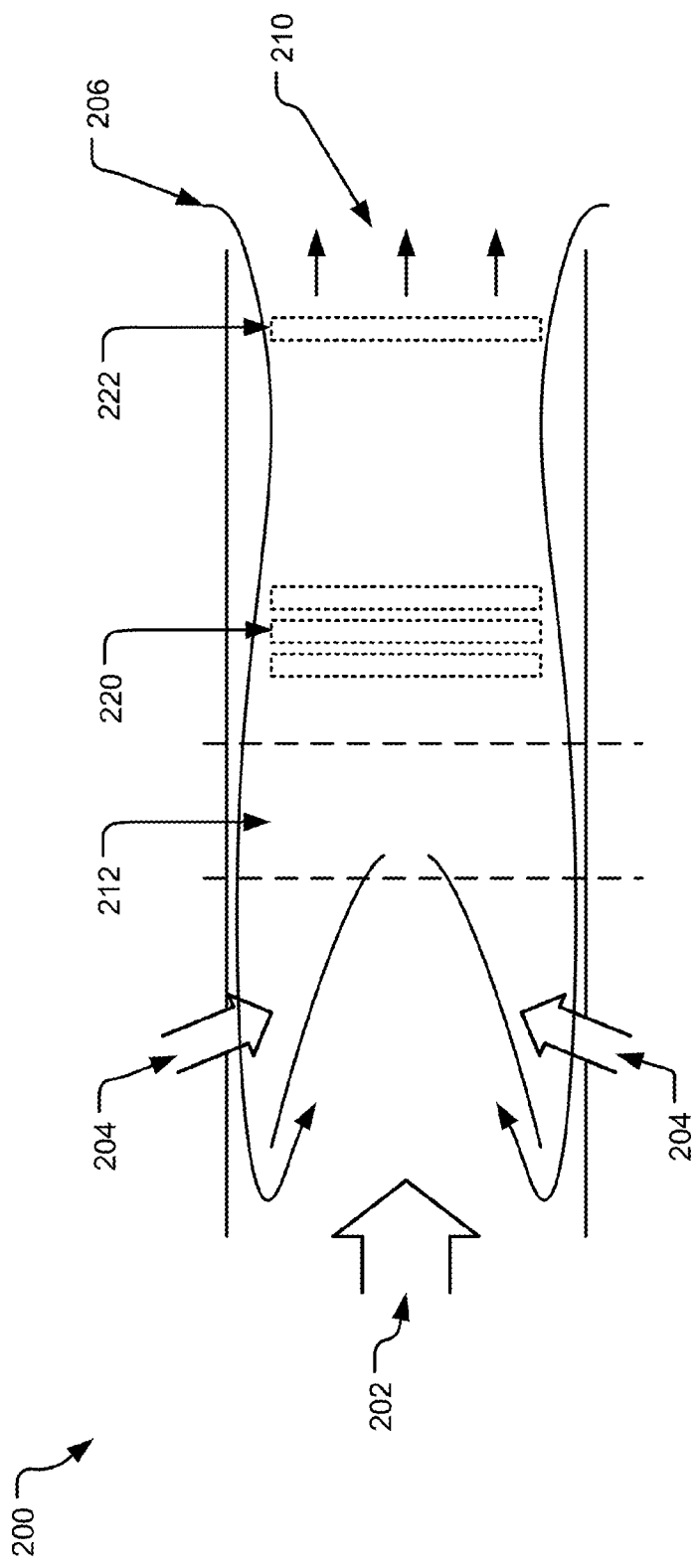
FIG. 2 illustrates second example implementation of a secondary chamber used to process smoke generated from waste.

FIG. 2 illustrates second example implementation of a secondary chamber 200 that may be used to process smoke generated from waste. Specifically, the secondary chamber 200 receives cold plasma 202 from a primary chamber. Such cold plasma 202 includes various radicals, singlet species, ionic species, high energy and excited state species, and molecular fragments. The cold plasma 202 may be at or above the temperature of 1000 degree Celsius. The secondary chamber 200 also receives smoke 204 from waste products, air, steam, and inert gases 206 from various concentric pipes (not disclosed). The amount of air, steam, and the inert gases 206 are monitored so as to control the processing of the smoke 204 in the secondary chamber 200. In one implementation of the secondary chamber 200, the air introduced from end of the secondary chamber distal from the end where the cold plasma 202 is introduced. In such an implementation, the flow of air is rotated around to cause a reverse vortex of air into a first section 212 of the secondary chamber 200. For example, the first section 212 may be operating at a temperature of 1100 degree Celsius. The introduction of the air using the reverse vortex keeps the outer wall of the secondary chamber 200 cool in presence of high inner temperature.

The smoke 204 introduced to the first section 212 may include various ignitable particles having high BTU value typically between 1 and 10 BTU/g (BTU per gram), but as high as 50 to 100 BTU/g. The impinging of the smoke 204 on the plasma 202 in the first section 212 initiates reaction to generate CH, $CH_2$, $CH_3$, etc., from the smoke. Subsequently these components start combining with the oxygen in the air to generate CO, $CO_2$, etc., as the cold plasma 202, the smoke 204, the air and the other components travel along the secondary chamber 200. Various components of the mixture at various points along the secondary chamber 200 are measured and based on the measured amounts, the input of smoke, air, steam, etc., is changed. Compositions at the start of the process are typically 2%-15% CO (carbon monoxide), 1% to 10% CxHy (representing a typical hydrocarbon either in gaseous or liquid droplet form), and 0.1% to 1% carbon soot. Compositions exiting the changer would reduce the CO to parts per million, reduce the hydrocarbon content to parts per million or even billion, eliminate all solid carbon, and create a small amount (parts per billion) of oxygenated volatile organic compounds. In one implementation, the amounts of the mixture are also changed in response to measured temperature in the secondary chamber 200. At relatively low temperatures—and well below operating temperatures, the amount of CO exiting the system would still be relatively high (parts per thousands). Meanwhile, at higher temperatures—and well above typical operating temperatures, the NOx concentration steadily increases due to the reaction of nitrogen in the air. Keeping the temperature controlled and at typical operating parameters for the system prevents the formation of appreciable concentrations of either unwanted species. In one implementation, the operating temperatures are in the range of 800 C. to 2000 C. Yet alternatively, the amount of mixture is also selected based on the waste products that are used to generate the smoke 204. Thus, for example, if the smoke 204 is generated using waste products from a hospital, the typical breakdown of hospital waste in terms of components is used to determine the mixture of air, steam, inert gas, etc., introduced in the secondary chamber. Yet alternatively, the mixture is determined based on ratio of various components in the waste product used to generate the smoke 204. The use of a carbon and hydrogen containing gas as an additive to stoichiometrically balance the reaction reduces the probability of compositional variants.

In an alternate implementation of the secondary chamber 200, various catalysts 220 are provided to affect the reactions among the cold plasma 202 and the smoke 204. For example, metal sponges mesh or other embodiment is used as the catalyst 220 in the secondary chamber. The catalysts—metal type—220 may be selected based on the typical breakdown of the waste product used to generate the smoke 204. For example, metals used are platinum, rhodium, nickel, some forms of iron and iron oxide, or alloys. The output 210 of the secondary chamber 200 is evaluated for various components such as $NO_R$, CO, VOCs, HCL, $SO_2$, etc. Based on the amount of one or more of these components, the input of the smoke 204, air, steam, etc., input to the secondary chamber is changed.

The components of the cold plasma 202 react with the components of the smoke 204 to convert the smoke particles into useful and benign products. For example, the smoke 204 introduced into the secondary chamber 200 includes various molecules, chemicals, chemical species, by-products from reactions, wastes, solvents, in-process unreacted materials, other carbonaceous materials, etc. The cold plasma 202 reacts with such components of the smoke 204 to generate output 210 including $NO_R$, CO, volatile organic compounds (VOCs), HCL, $SO_2$, etc.

In yet alternative implementation of the secondary chamber 200 a metal scrubber 222 is used at the exit end of the secondary chamber 200. Such a metal scrubber 222 is used to scrub metal components from the output 210 of the secondary chamber 200. The type of the metal scrubber 222 used in a particular secondary chamber 200 may be determined based on the type of the waste product used to generate smoke, etc. The output 210 is typically at a very high temperature, in the range of 1000 degree Celsius. In an alternative implementation of the secondary chamber 200, the heat energy from the output 210 is collected and or diverted for other use. Such collection and divergence of the heat energy increases the efficiency of the secondary chamber 200.

Because the secondary chamber 200 is using cold plasma 202 to react with the smoke 204, a plasma torch used in the secondary chamber may be operated at very low current, wherein the torch impinges plasma on the smoke or the smoke is impinged on the plasma in the secondary chamber. For example, the plasma torch may be operated at around 1 ampere, at very low average power, around 1000 watts or less, and at very high potential, around 1000 kV. Such operating parameters provide for a low-intensity operating process that does not have any flame typical of combustion processes. As a result, a waste disposal system using the cold plasma in the secondary chamber 200 does not require afterburners that are typical in conventional combustion processes or pyrolytic systems. In an implementation, the secondary chamber 200 is operated using DC power. Yet alternatively, such DC power is pulsed.

Figure 3:
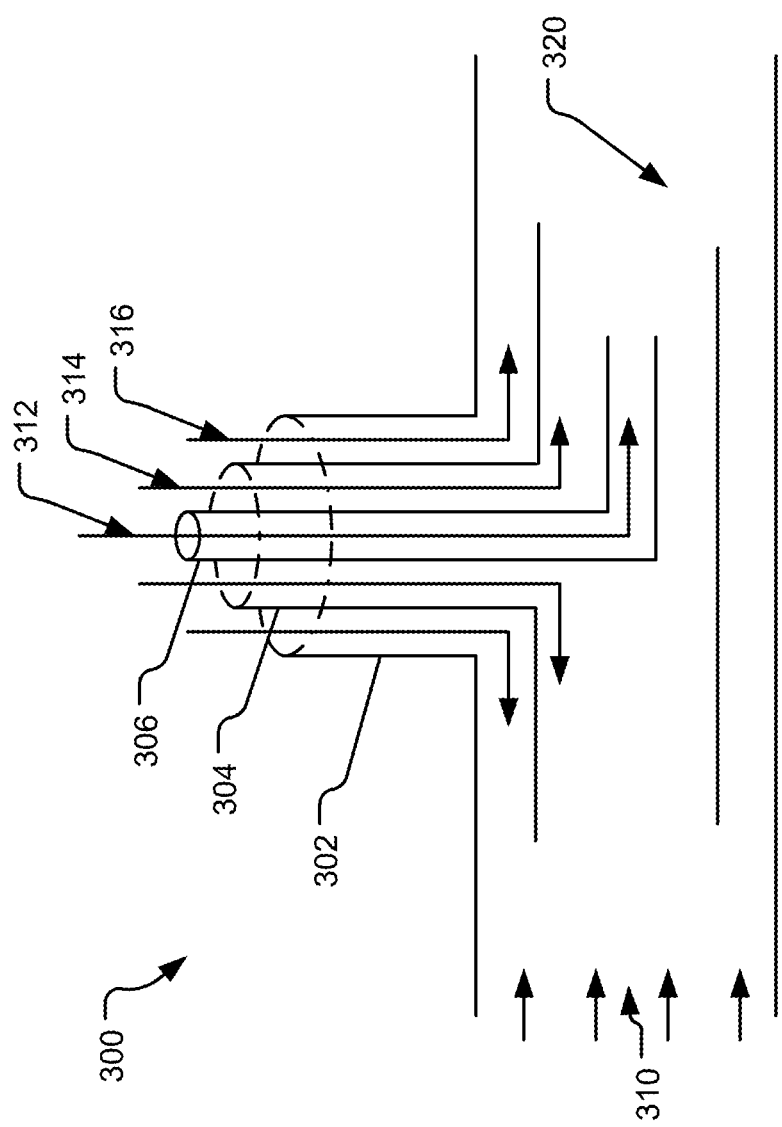
FIG. 3 is a block diagram of an example concentric pipe system used in the secondary chamber.

FIG. 3 illustrates an implementation of a secondary chamber 300 using a number of concentric pipes. Specifically, the implementation of the secondary chamber 300 discloses three concentric pipes 302, 304, and 306. However, in an alternative implementation, more or less number of concentric parts may also be used. The secondary chamber 300 is used to impinge smoke generated from waste products onto cold plasma 310. In one implementation, the cold plasma 300 is introduced into the secondary chamber 300 from a primary chamber (not shown). The cold plasma 300 may include a stream of free radicals including a plurality of free radicals, singlet species, ionic species, high energy and excited state species, and molecular fragments. The cold plasma 300 may react with the components of the smoke to useful or benign products. The smoke introduced into the secondary chamber 300 may include gasses from the pyrolytic process including all molecules, chemicals, chemical species, by products from reactions, wastes, solvents, in-process unreacted materials and other carbonaceous materials.

The concentric pipes 302, 304, and 306 are used to introduce air, steam, and inert gases into the secondary chamber 300. In an alternative implementation, or one or more of the flows may be introduced at an angle to the main flow. In one implementation, an inner pipe 306 is used to insert inert gases 312, a middle pipe 304 is used to insert steam 314, and an outer pipe 302 is used to insert air 316 into the secondary chamber 300. The introduction of air 316 through the outer pipe 302 allows cooling of the outer walls of the secondary chamber 300. Furthermore, the introduction of the air, steam, and the inert gas in the manner described herein allows creation of reverse vortex in the secondary chamber that provides momentum to the flow of cold plasma 310 through the secondary chamber 300 towards an exit end 320. As the cold plasma 300 travels through the secondary chamber 300, it reacts with the smoke to generate useful and benign products towards the exit end 320 of the secondary chamber 300.

In an alternative implementation, the pipes 302, 304, 306 are not concentric. For example, while the inner pipe 306 is disposed inside the middle pipe 304, it is not necessarily disposed concentric to the pipe 306. Thus, for example, the inner pipe 306 may be disposed in a manner such that it is not centered at the same axis as the center of the middle pipe 304, etc. Furthermore, the secondary chamber 300 of FIG. 3 discloses using air flowing in at right angle (or other angles) to the pipes to create a reverse vortex. In one implementation, air-flow is split in several ways and divided between the flow direction vents, the concentric pipes, and the plasma torch—either in combination or singularly. In an alternative implementation, pressure systems may be used in place of the concentric pipes to generate the reverse vortex inside the secondary chamber 300. Yet alternatively, ions may be used to create the vortex in the secondary pipes wherein the ions are used to generate a pulling force on the cold plasma 310.

Figure 4:
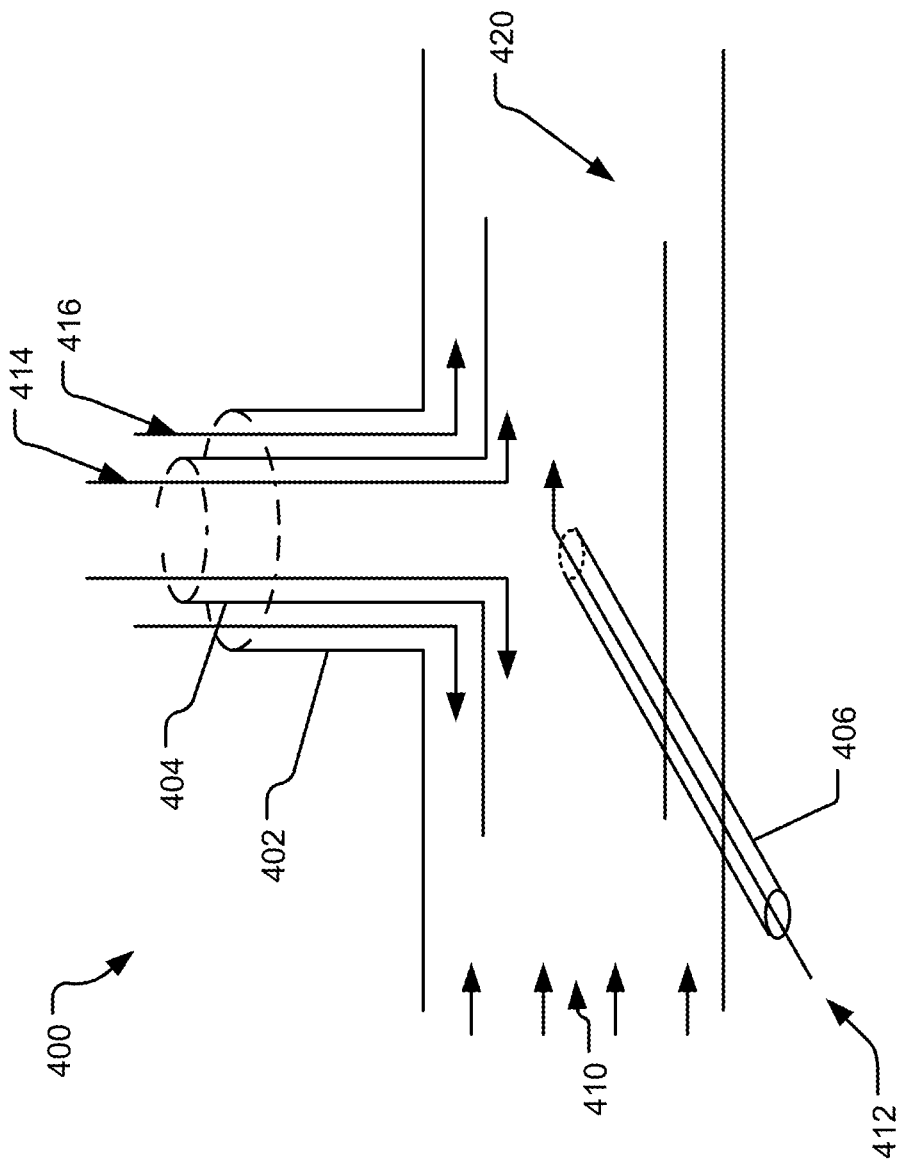
FIG. 4 is a block diagram of an alternative of example pipe system used in the secondary chamber.

FIG. 4 illustrates an alternative implementation of a secondary chamber 400 using number of pipes some of the pipes are concentric and one or more pipes are at an angle to the concentric pipes. Specifically, the implementation of the secondary chamber 400 discloses two concentric pipes 402 and 404, and another pipe 406 at an angle to the concentric pipes 402 and 404. The secondary chamber 400 is used to impinge smoke generated from waste products onto cold plasma 410. In one implementation, the cold plasma 400 is introduced into the secondary chamber 300 from a primary chamber (not shown). The pipes 402, 404, and 406 are used to introduce air, steam, and inert gases into the secondary chamber 400.

Figure 5:
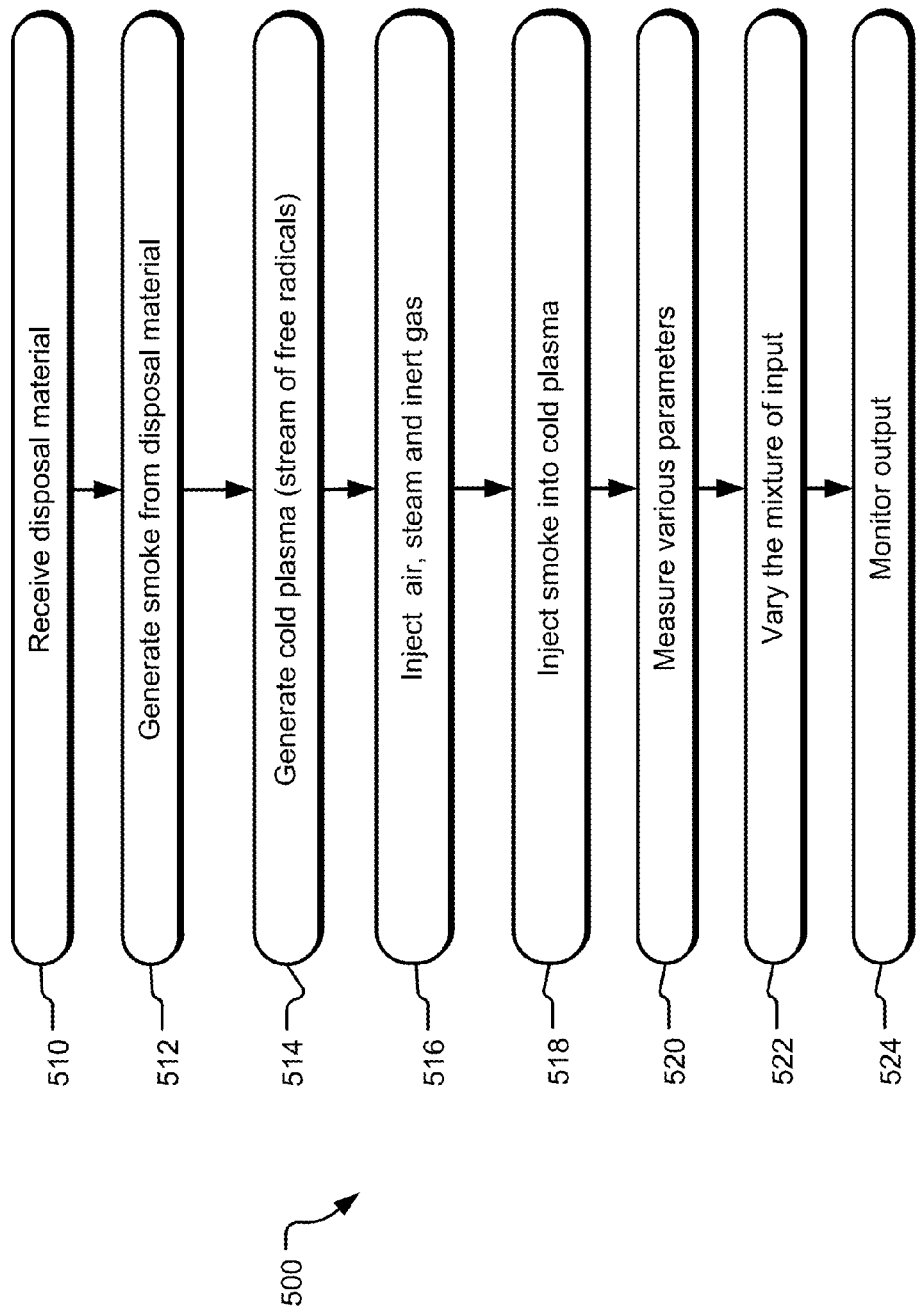
FIG. 5 illustrates example operations used by the waste disposal system used herein.

FIG. 5 illustrates various operations 500 for disposing waste using a cold plasma system. Note that while the operations 500 are disclosed in a particular order, in other implementation, the operations 500 may be performed in an alternate order than as disclosed herein. Specifically, an operation 510 receives disposal material for the waste disposal system. Such disposal material may be, for example, hospital waste material in red bags, chemical waste material, other industrial waste material from a factory, etc. Subsequently, an operation 512 generates smoke from the disposal material. In one implementation, the operation 512 may generate flow from the waste products using non-pyrolytic or non-thermal process.

Subsequently, an operation 514 generates cold plasma or a stream of free radicals. In one implementation, the operation 514 generates cold plasma using a non-equilibrium non-thermal plasma discharge-system-reactor, with the plasma zone created through microwave systems, dielectric barrier discharges, repetitively pulsed nanosecond discharges, or Jacob's ladder based discharges, or other similar process.

Subsequently, an injecting operation 516 injects air, steam, and inert gas into the secondary chamber to further cause the reactions that convert smoke components into benign products. The components of the cold plasma react with the components of the smoke to convert the smoke components into various benign products. Another injecting operation 518 injects smoke into a stream of cold plasma. In one implementation, the injecting operation 518 uses a secondary chamber in which smoke is injected onto a stream of cold plasma.

Subsequently, a measuring operation 520 measures various parameters inside the secondary chamber where the cold plasma is reacting with the smoke. For example, the measuring operation 520 measures the temperature and pressure inside the secondary chamber, the composition of various components inside the secondary chamber, etc. A varying operation 522 uses the measured value of the various parameters to determine if there are any changes necessary to the input mixture, the temperature, etc., inside the secondary chamber. For example, if the measuring operation 520 detects an excess amount of water droplets in the secondary chamber, the varying operation 522 reduces the amount of steam input to the secondary chamber. A monitoring operation 524 monitors the output from the secondary chamber. Such output may be, for example, hydrogen, oxygen, various metals, etc. In an implementation, the composition of the mixture of smoke, air, steam, and inert gases input to the secondary chamber may also be varied based on the measured output by operation 524.

Figure 6:
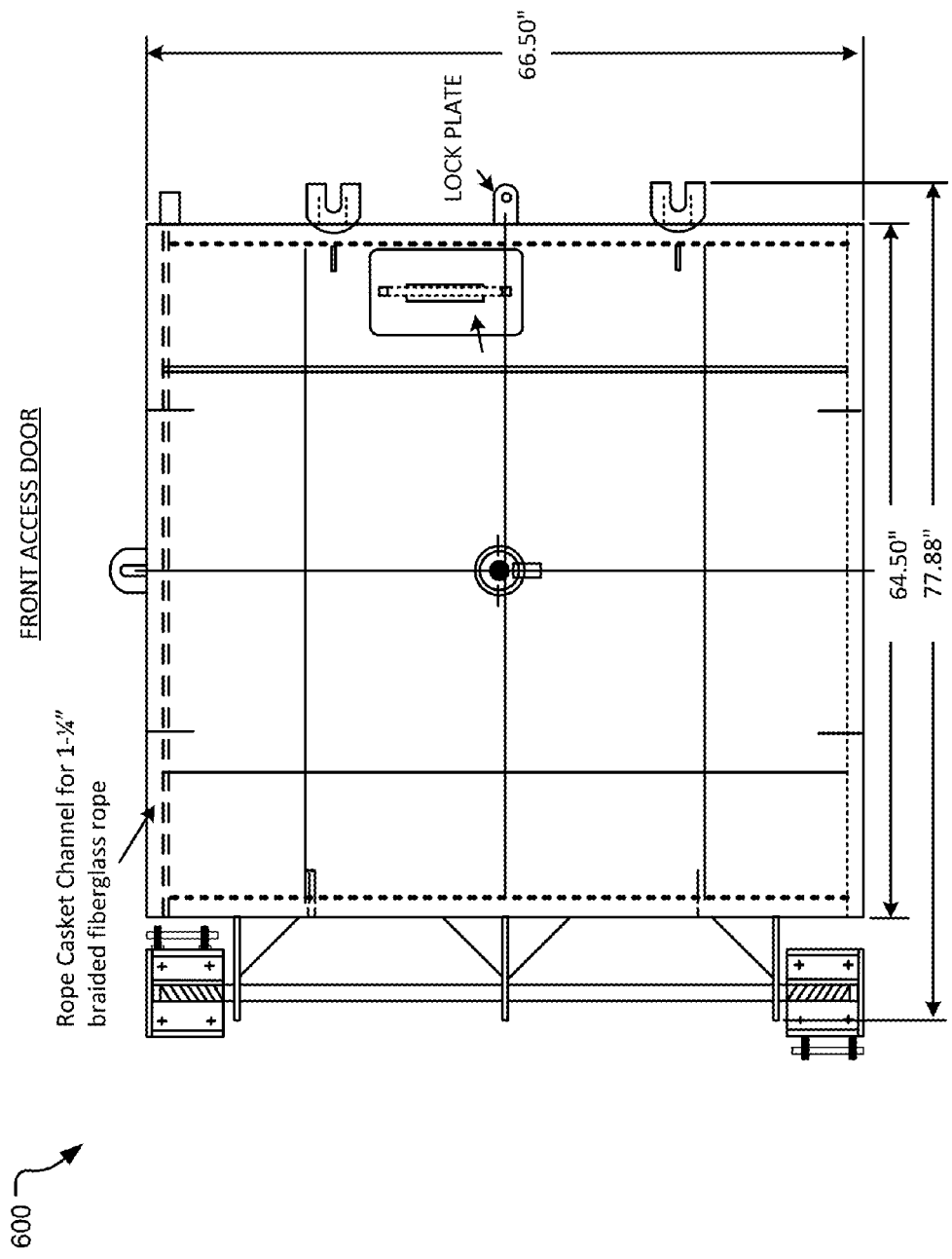
FIG. 6 illustrates a front view of an example waste processor.

FIG. 6 illustrates a front view 600 of a waste processor that may be used to process waste products, such as hospital waste contained in red bags. The waste processor is used to generate smoke from the waste products.

Figure 7:
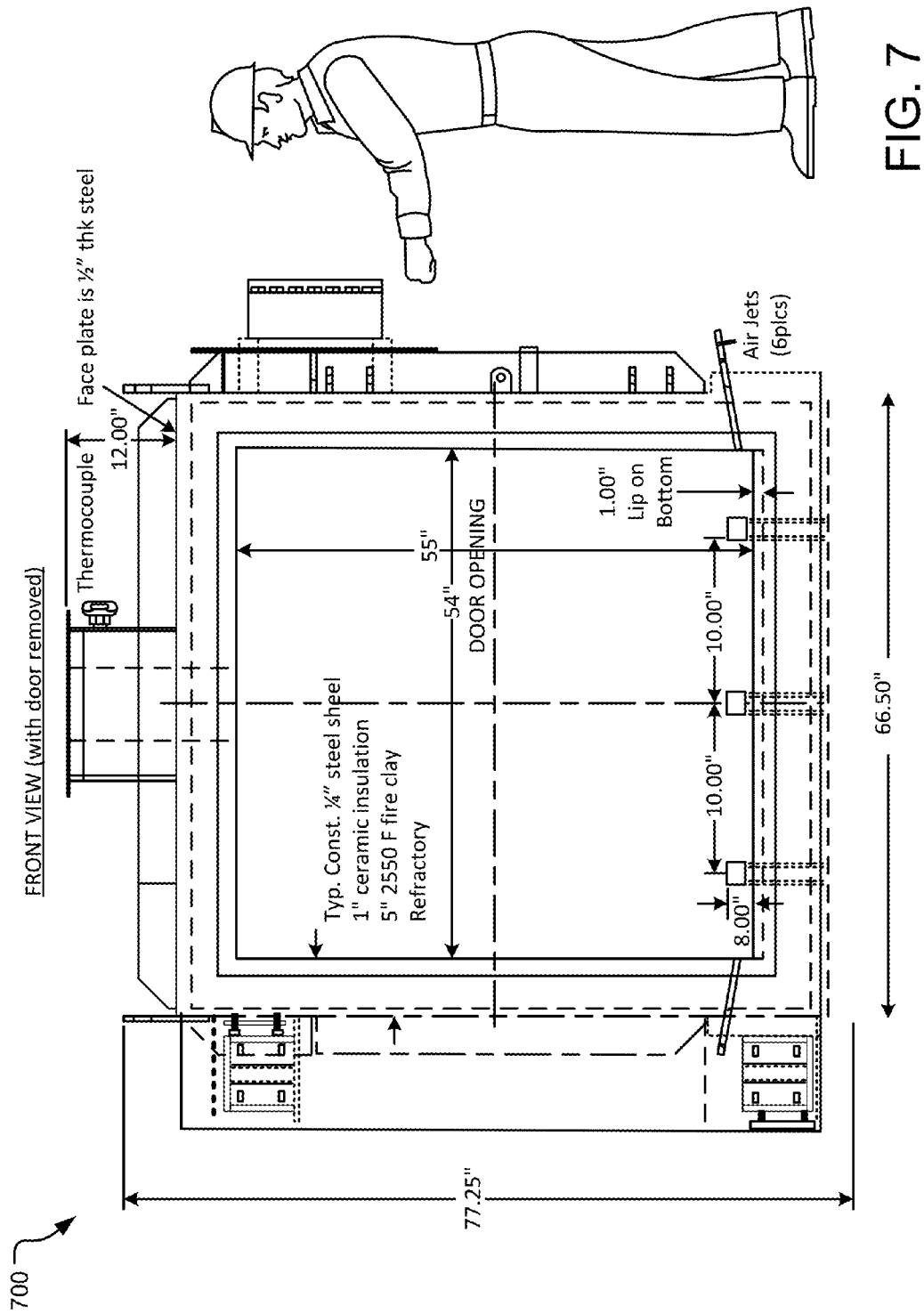
FIG. 7 illustrates a front view of the example waste processor with the door to the waste processor removed.

FIG. 7 illustrates a front view 700 of the waste processor with the door to the waste processor removed.

Figure 8:
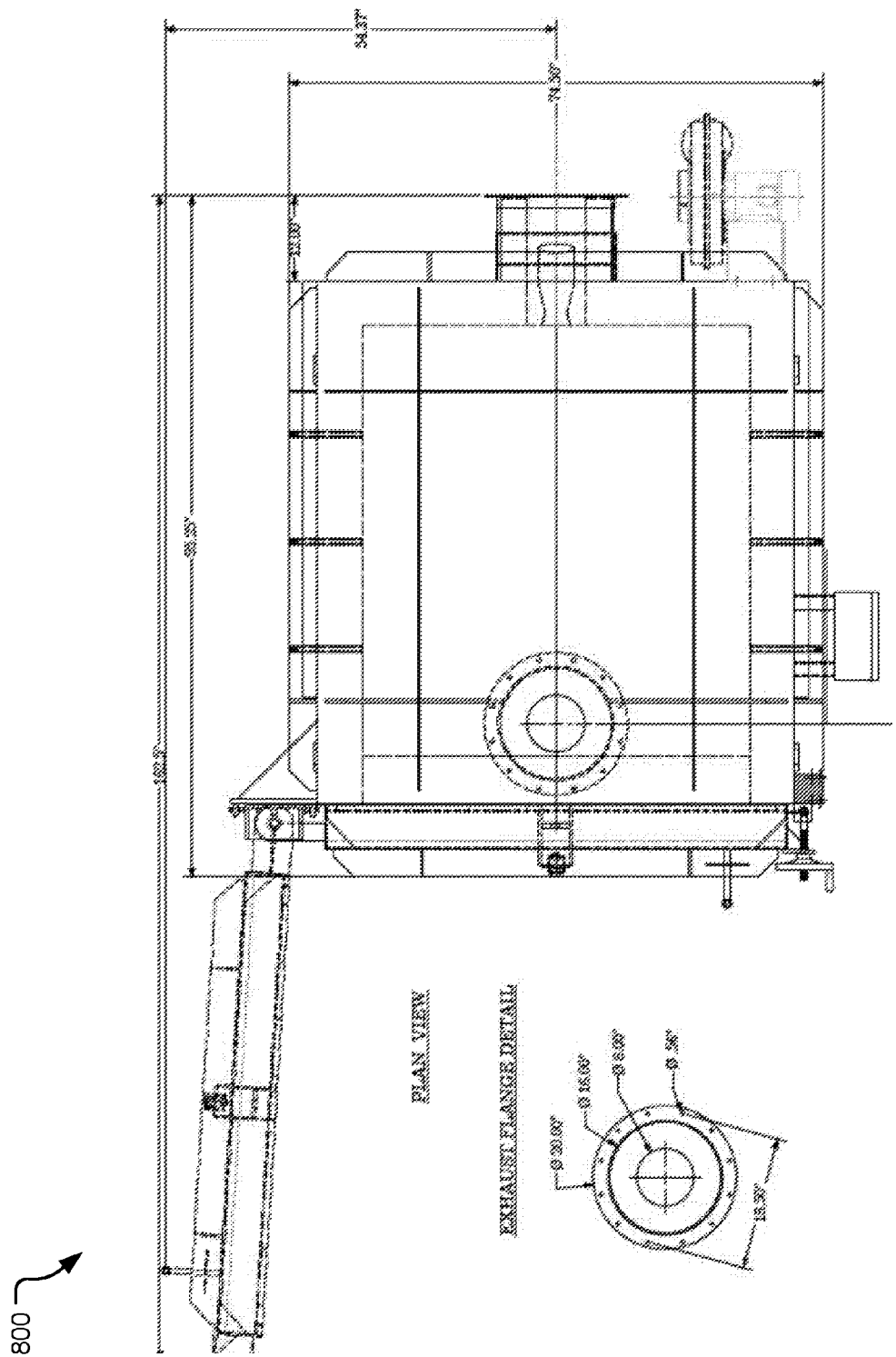
FIG. 8 illustrates a top or plan view of the example waste processor.

FIG. 8 illustrates a top or plan view 800 of the waste processor.

Figure 9:
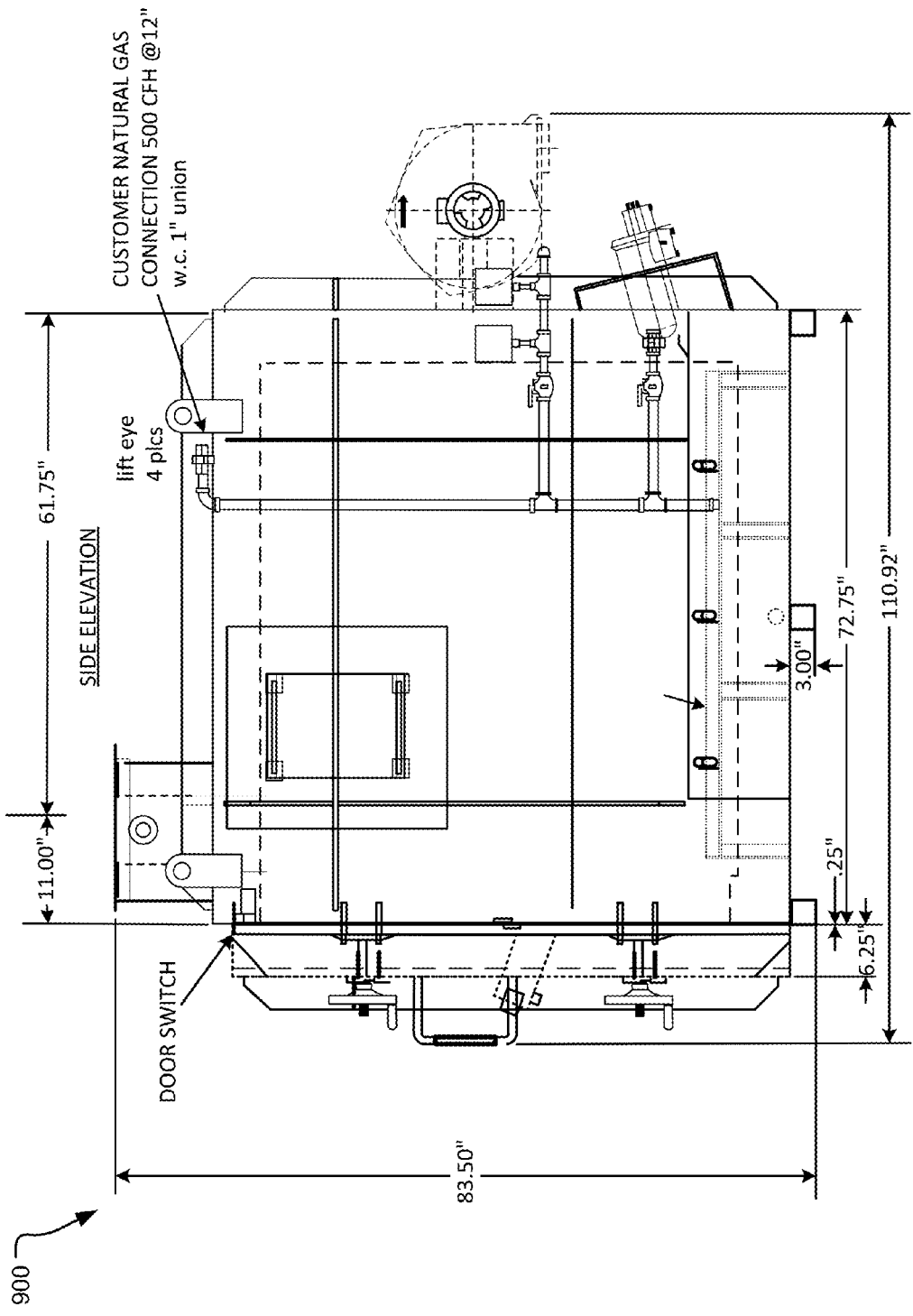
FIG. 9 illustrates a side or elevation view of the example waste processor.

FIG. 9 illustrates a side or elevation view 900 of the waste processor.

Figure 10:
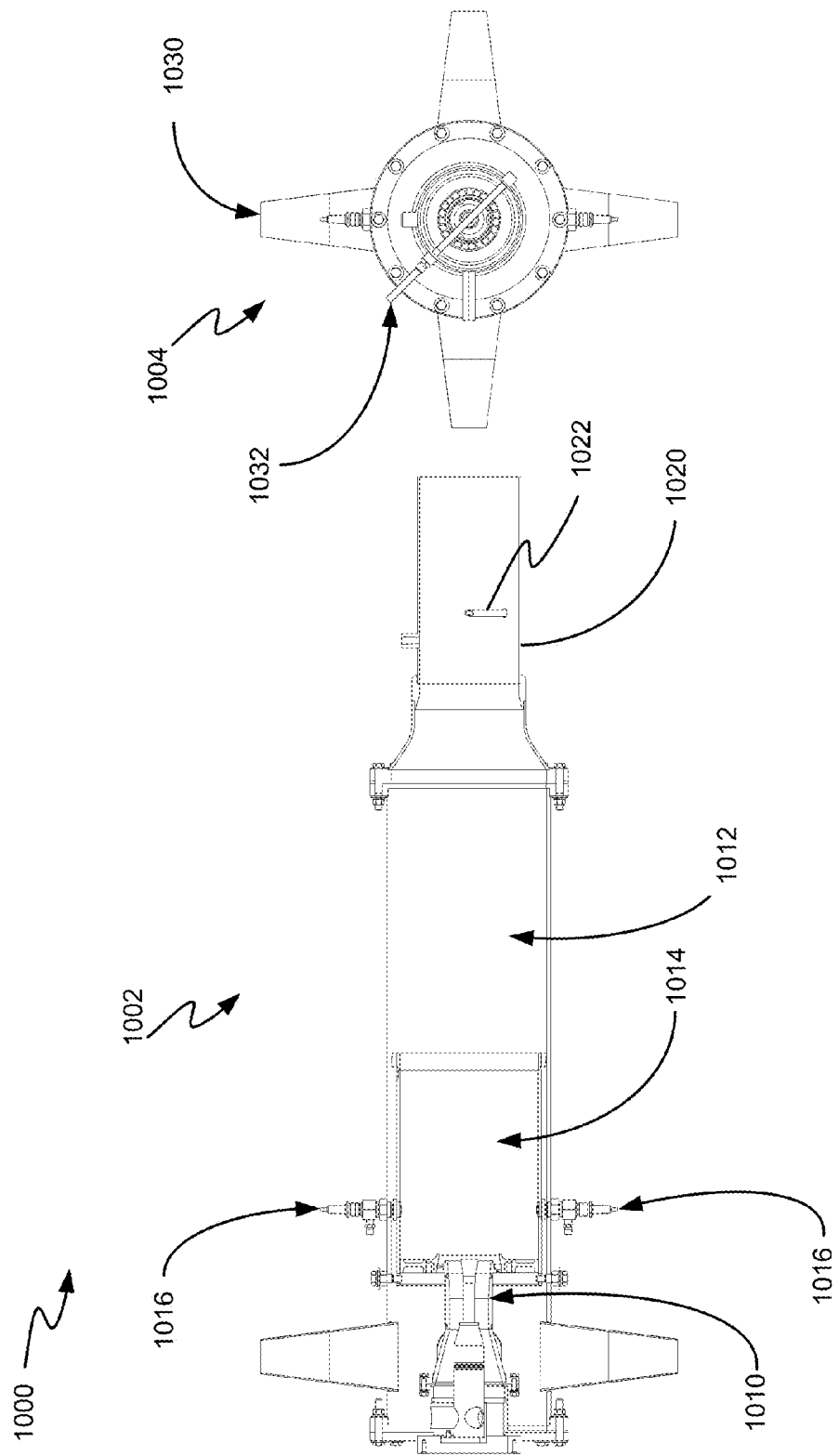
FIG. 10 illustrates side and front views of an example waste disposal system disclosed herein.

FIG. 10 illustrates side and front views of secondary chamber 1000 of an example waste disposal system disclosed herein. Specifically, FIG. 10 illustrates a side view 1002 illustrating the secondary chamber of the waste disposal system and a front view 1004 of the secondary chamber of the waste disposal system. The secondary chamber 1000 is connected to various concentric pipes 1010 to receive air, smoke, etc. In an alternative implementation, one or more of the pipes 1010 may be at an angle to the other pipes. The secondary chamber 1000 includes reaction zones 1012, 1014 where various reactions take place. The secondary chamber 1000 may be connected to plasma torch via one or more plasma injection points 1016. An end of the secondary chamber 1000 includes a discharge zone 1020. In one implementation, a sensor apparatus 1022 is attached to the discharge zone, wherein the sensor apparatus 1022 may be configured to measure temperature, pressure, and other parameters of the content in the discharge zone 1022. The measured value of the parameters may be used to control the flow of air, smoke, plasma, etc., into the secondary chamber 1000. The front view 1004 of the secondary chamber 1000 illustrates air flow injection points 1030, optional steam injection point 1032, etc., that are connected to the one or more of the pipes 1010.

Figure 11:
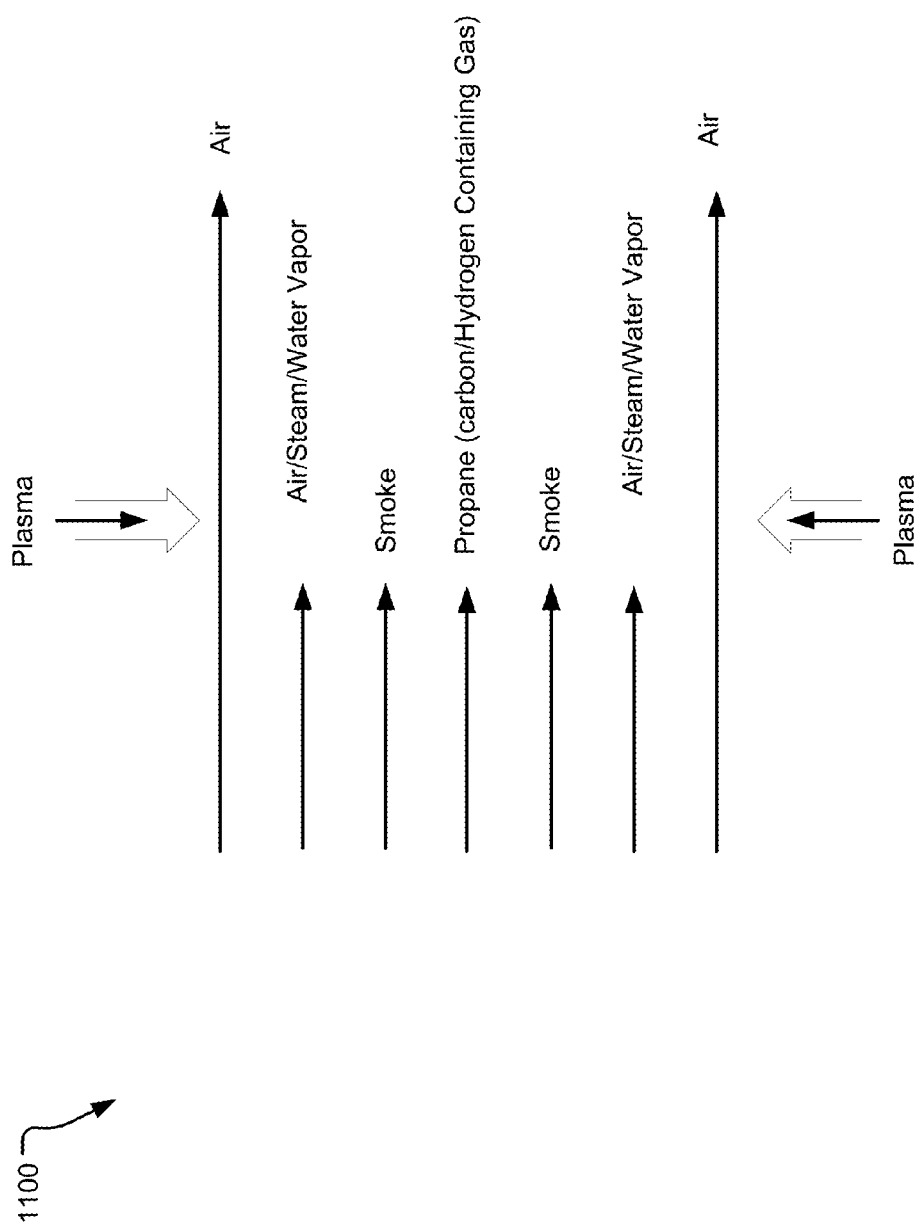
FIG. 11 illustrates example flow of various content into the secondary chamber of the waste disposal system.

FIG. 11 illustrates example flow 1100 of various content into the secondary chamber of the waste disposal system.

The waste disposal system disclosed herein breaks down waste using a primary pyrolysis process followed by a discharge chamber or primary region of a discharge chamber to generate a plurality of radicals, singlet species, ionic species, high energy and excited state species, and molecular fragments to chemically react and convert gasses from the pyrolytic process including all molecules, chemicals, chemical species, by products from reactions, wastes, solvents, in-process unreacted materials and other carbonaceous materials to useful or benign products present in a secondary discharge chamber or secondary region of a common discharge chamber.

In one implementation, The reaction takes place by impinging the output of a gas discharge system created in a primary discharge chamber or primary region of a common discharge chamber onto the material to be converted or reacted which is present in a secondary discharge chamber or secondary region of a common discharge chamber.

The starting material used in the primary discharge chamber, primary region of a common discharge chamber or reactor ideally comprises polar inorganic or organic molecules (example: water, ammonia, amines, alcohols, etc.) which are converted to singlet state species, reactive radicals and intermediates, ions, and excited state species of the original material, and made to impinge on a stream of the main material to be reacted. The impinging stream and main material to be reacted are combined in a secondary high field region of a common or separate reactor, wherein chemical reactions are induced and the material to be treated is converted to benign or other useful products. The overall common or individual reactor design is optimized to facilitate energy management and capture.

The discharge chambers are characterized by discharge systems operating at very low current (~1 A) and low average power (~1000 W), but very high potential (kV). This and non-combustion process and apparatus is low intensity, does not have a conventional flame front typical of combustion processes and does not require afterburners typical of conventional combustion processes or pyrolytic systems.

The primary discharge chamber can also be used to chemically react and convert gasses from full oxidation combustion processes, partial oxidation combustion processes, and all related systems. In addition, gasses of carbonaceous materials, fine sprays, dusts, solutions, and amalgams can also be used to chemically react and convert gasses from full oxidation combustion processes, partial oxidation combustion processes, and all related systems.

A novel non-combustion method, process and apparatus to chemically react and convert chemical species, by products from chemical reactions, wastes of any kind, solvents, in-process unreacted materials, biomass and any carbonaceous materials to useful or benign products through the use of a primary pyrolysis process followed by a discharge chamber or primary region of a discharge chamber to generate a plurality of radicals, singlet species, ionic species, high energy and excited state species, and molecular fragments to chemically react and convert gasses from the pyrolytic process including all molecules, chemicals, chemical species, by products from reactions, wastes, solvents, in-process unreacted materials and other carbonaceous materials to useful or benign products present in a secondary discharge chamber or secondary region of a common discharge chamber.

The primary discharge chamber is a (i) stoichiometrically controlled primary discharge-system reactor to create singlet state species, reactive radicals and intermediates, ions, and excited state species that (ii) act on, break down and react with organic or inorganic molecules, chemicals, chemical species, byproducts from chemical reactions, wastes of any kind, solvents, in-process unreacted materials, biomass and any carbonaceous materials in a secondary stoichiometrically controlled discharge-system-reactor or (iii) in an alternate region of a common discharge-system reactor.

In an alternative implementation, the primary and secondary reactors comprise a non-equilibrium non-thermal plasma discharge-system-reactor, with the plasma zone created through microwave systems, dielectric barrier discharges, repetitively pulsed nanosecond discharges or Jacob's ladder based discharges or other similar process. In yet alternative implementation, the primary and secondary reactors are distinct zones in a common reactor, and the reactor comprises a non-equilibrium non-thermal plasma discharge-system-reactor, with the plasma zone created through microwave systems, dielectric barrier discharges, repetitively pulsed nanosecond discharges or Jacob's ladder based discharges. In one implementation, the primary discharge-system-reactor is used to create the singlet state species, reactive radicals and intermediates, ions, and excited state species.

In an alternative implementation, the secondary discharge-system-reactor is used to allow the output of the primary discharge-system-reactor to act on and decompose the material to be converted such as organic or inorganic molecules, chemicals, chemical species, byproducts from chemical reactions, wastes of any kind, solvents, in-process unreacted materials, biomass and any carbonaceous materials, effluent, stack gas, output from pyrolytic processes, output from combustion, seepage from thermal treatment, landfill effluents, landfill gas, waste of any kind, carbonaceous material, materials of biological origin, treatment chemicals, and similar wastes.

In one implementation, the primary reactor is a discharge chamber, which has initial feed inlets at the base of the reactor. Alternatively, the primary reactor is a discharge chamber, which has secondary feed inlets above and distinct from the initial feed inlets. The primary reactor may be characterized by a discharge chamber in which the initial feed into the chamber can be a liquid, aerosol solid or dissolved carbon source to provide initiation or stoichiometric control. Alternatively, the primary reactor includes by a discharge chamber in which other initial feed into the chamber comprises air, inert or reactive gasses, noble gasses, or other polar organic or inorganic molecules to provide initiation or stoichiometric control. Yet alternatively, the primary reactor includes a discharge chamber in which the other initial feed into the chamber comprises a plurality of ingredients in combination and selected among air, inert or reactive gasses, noble gasses, or other organic or inorganic molecules.

In one implementation of the waste disposal system, the primary reactor includes a discharge chamber in which the secondary feed into the chamber comprises polar organic or inorganic molecules such as water, ammonia, hydrogen sulfide, alcohols, or similar species. Alternatively, primary reactor includes a discharge chamber in which the tertiary feed into the chamber comprises polar organic or inorganic molecules such as water, ammonia, or similar species. Alternatively, the primary reactor includes a discharge chamber in which the secondary and tertiary feed into the chamber comprises polar organic or inorganic molecules such as steam, saturated steam, superheated steam, ammonia, and blends thereof.

In one implementation, the waste disposal process is carried out by impinging the output of a discharge-system-reactor created in a primary region of a common discharge-system-reactor or a separate discharge-system-reactor onto the material to be converted or reacted which is present in a second region of a common discharge-system-reactor or separate discharge-system-reactor through the use of an in-line mixer injector.

An implementation of the waste disposal system includes a primary discharge-system-reactor that is stoichiometrically controlled by introducing one or more organic or inorganic molecules, polar molecules, air, and molecules containing oxygen, nitrogen, phosphorus, sulfur, carbon and halogens, metalloids, noble gasses and non metals, which can convert these molecules into a plurality of reactive species, reactive intermediates, radicals, charged particles, singlet state moieties, which can be used to react with the main stream of material to be converted. In one implementation, the starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. Alternatively, the starting material used in the first stage, region or reactor comprises polar inorganic or organic molecules like water, ammonia, phosphine, hydrogen sulfide, carbon dioxide, carbon disulfide, methanol, formaldehyde, formic acid, ethers, or similar compounds, which are converted to singlet state species, reactive radicals and intermediates, ions, and excited state species of the original material, and made to impinge on a stream of the material to be reacted.

An implementation of the waste disposal system includes a secondary reactor with a discharge chamber in which the first feed is the output of the primary reactor, which impinges on the material to be converted. Alternatively, the secondary reactor includes a discharge chamber in which the secondary feed comprises the material to be converted. Yet alternatively, the secondary reactor includes a discharge chamber in which the tertiary feed comprises the material to be converted.

The two independent discharge chambers may comprise distinct regions within a common chamber separated by a finite distance. Alternatively, the two independent discharge chambers comprise distinct regions within a common chamber separated by a finite distance, wherein the finite distance is one reactor diameter to ten reactor diameters. Yet alternatively, the two independent discharge chambers comprise distinct regions within a common chamber separated by a finite distance, with the finite distance is three reactor diameters to five reactor diameters.

An implementation of the waste disposal system includes two reactors or distinct regions in a common reactor, wherein the reactors includes discharge chambers. In one implementation, the system consists of two reactors or distinct regions in a common reactor, and the reactors include discharge chambers operating with DC power, which is pulsed. Yet alternatively, the material to be converted or reacted on in the secondary chamber or region can be any organic or inorganic molecules, chemicals, chemical species, byproducts from chemical reactions, wastes of any kind, solvents, in-process unreacted materials, biomass and any carbonaceous materials, solvents containing excess raw materials, and similar compounds. Alternatively, the material to be converted or reacted in the secondary chamber or region consists of any type of waste product, industrial waste, municipal waste, waste from chemical processes, biological waste, biomass, medical waste, pharmacy waste, animal waste, sludges and effluents, biogases, sour gas and similar compounds. Yet alternatively, the material to be converted or reacted in the secondary chamber or region consists of any type of effluent, stack gas, output from pyrolytic processes, output from combustion, seepage from thermal treatment, landfill effluents, landfill gas, waste of any kind, carbonaceous material, materials of biological origin, treatment chemicals, and similar wastes.

In one implementation, the waste disposal is carried out by impinging the output of a discharge-system-reactor created in a primary region of a common discharge-system-reactor or a separate discharge-system-reactor onto the material to be converted or reacted which is present in a secondary region of a common discharge-system-reactor or separate discharge-system-reactor through the use of an in-line mixer injector. Alternatively, the two regions of the discharge-system-reactor can be part of a common discharge-system-reactor or two distinct gas-discharge-systems-reactors, which are connected through the use of an in-line mixer injector. Yet alternatively, the two regions of the discharge-system-reactor can be part of a common discharge-system-reactor or two distinct gas-discharge-systems-reactors, which are connected through the use of a pipe. In one alternative implementation, the two regions of the discharge-system-reactor can be part of a common discharge-system-reactor or two distinct gas-discharge-systems-reactors, which are connected through the use of a catalytic region to enhance conversion. Yet alternatively, the two regions of the discharge-system-reactor can be part of a common discharge-system-reactor or two distinct gas-discharge-systems-reactors, which are connected through the use of a catalytic region, made of noble metals, transition metals, their corresponding oxides, and activated species.

An implementation of the waste disposal system disclosed herein includes a primary discharge-system-reactor that is stoichiometrically controlled by introducing one or more organic or inorganic molecules, polar molecules, air, and molecules containing oxygen, nitrogen, phosphorus, sulfur, carbon and halogens, metalloids, noble gasses and non metals, which can convert these molecules into a plurality of reactive species, reactive intermediates, radicals, charged particles, singlet state moieties, which can be used to react with the main stream of material to be converted. In one implementation, the starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. Alternatively, the starting material used in the first stage, region or reactor comprises polar inorganic or organic molecules like water, ammonia, phosphine, hydrogen sulfide, carbon dioxide, carbon disulfide, methanol, formaldehyde, formic acid, ethers, or similar compounds, which are converted to singlet state species, reactive radicals and intermediates, ions, and excited state species of the original material, and made to impinge on a stream of the material to be reacted.

In one implementation of the waste disposal system, the flow, mass output and linear flow rate of the output of the primary discharge-system-reactor are controlled to provide sufficient reactive species to consume all the material to be reacted in the secondary discharge-system-reactor. Alternatively, the material to be reacted is impinged onto the output of a discharge-system-reactor created in a primary region or reactor, which is present in a second region of a common or separate reactor. The starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. Yet alternatively, a discharge-system-reactor where the primary and secondary regions can comprise two distinct reactors or two distinct areas of a common reactor, which are connected through the use of an in-line mixer injector.

Alternatively, the two regions of the discharge-system-reactor can be part of a common discharge-system-reactor or two distinct gas-discharge-systems-reactors, which are connected through the use of a pipe. Yet alternatively, the two regions of the discharge-system-reactor can be part of a common discharge-system-reactor or two distinct gas-discharge-systems-reactors, which are connected through the use of a catalytic region to enhance conversion. Alternatively, the two regions of the discharge-system-reactor can be part of a common discharge-system-reactor or two distinct gas-discharge-systems-reactors, which are connected through the use of a catalytic region, made of noble metals, transition metals, their corresponding oxides, and activated species.

In one implementation, the starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. Alternatively, the starting material used in the first stage, region or reactor comprises polar inorganic or organic molecules like water, ammonia, phosphine, hydrogen sulfide, carbon dioxide, carbon disulfide, methanol, formaldehyde, formic acid, ethers, or similar compounds, which are converted to singlet state species, reactive radicals and intermediates, ions, and excited state species of the original material, and made to impinge on a stream of the material to be reacted. Yet alternatively, the blending of the impinging stream and material to be converted is carried out using an in-line mixer, which maximizes turbulence, reaction kinetics, diffusion rates and species transport. Alternatively, the blending of the impinging stream and material to be converted are mixed using an in-line mixer composed of catalytic metals and activated surfaces, modified activated surfaces, plated activated surfaces, laminates and coated surfaces that enhance the overall reaction.

In an alternative implementation, the blending of the impinging stream and material to be converted are mixed using a mixing chamber which consists of catalytic metal and metal oxide gauzes, sponges, impregnated porous materials and surface treated materials, activated surfaces, modified activated surfaces, plated activated surfaces, laminates and coated surfaces that enhance the overall reaction. Alternatively, the output of a discharge-system-reactor created in a primary region of a common discharge-system-reactor or a separate discharge-system-reactor is impinged onto the material to be converted or reacted which is present in a second region of a common discharge-system-reactor or separate discharge-system-reactor through the use of an in-line mixer injector. Yet alternatively, the two regions of the discharge-system-reactor can be part of a common discharge-systemreactor or two distinct gas-discharge-systems-reactors, which are connected through the use of an in-line mixer injector.

In yet alternative implementation, the two regions of the discharge-system-reactor can be part of a common discharge-system-reactor or two distinct gas-discharge-systems-reactors, which are connected through the use of a pipe. Alternatively, the two regions of the discharge-system-reactor can be part of a common discharge-system-reactor or two distinct gas-discharge-systems-reactors, which are connected through the use of a catalytic region to enhance conversion. Yet alternatively, the two regions of the discharge-system-reactor can be part of a common discharge-system-reactor or two distinct gas-discharge-systems-reactors, which are connected through the use of a catalytic region made of noble metals, transition metals, their corresponding oxides, and activated species.

In one implementation, the starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. Alternatively, the starting material used in the first stage, region or reactor comprises polar inorganic or organic molecules like water, ammonia, phosphine, hydrogen sulfide, carbon dioxide, carbon disulfide, methanol, formaldehyde, formic acid, ethers, or similar compounds, which are converted to singlet state species, reactive radicals and intermediates, ions, and excited state species of the original material, and made to impinge on a stream of the material to be reacted.

In an alternative implementation, the material to be reacted is impinged onto the output of a gas discharge system created in a primary region or reactor onto the material to be converted or reacted, which is present in a second region of a common or separate reactor. The starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. Alternatively, the starting material used in the first stage, region or reactor comprises polar inorganic or organic molecules like water, ammonia, phosphine, hydrogen sulfide, carbon dioxide, carbon disulfide, methanol, formaldehyde, formic acid, ethers, or similar compounds, which are converted to singlet state species, reactive radicals and intermediates, ions, and excited state species of the original material, and made to impinge on a stream of the material to be reacted. Yet alternatively, the material to be reacted is impinged onto the output of a gas discharge system created in a primary region or reactor onto the material to be converted or reacted, which is present in a second region of a common or separate reactor. The starting material used in the first stage, region or reactor comprises polar inorganic or organic molecules like water, ammonia, methanol, formaldehyde, formic acid, ethers, or similar compounds, which are converted to singlet state species, reactive radicals and intermediates, ions, and excited state species of the original material. The material to be converted or reacted can be any chemical compound, byproducts from reactions, solvent and byproduct containing solvents, solvents containing unreacted species, solvents containing excess raw materials, wastes, and similar compounds including bacterial, microbial and viral systems, human and animal tissue.

In one implementation, the blending of the impinging stream and material to be converted is carried out using an in-line mixer, which maximizes turbulence, reaction kinetics, diffusion rates and species transport. Alternatively, the blending of the impinging stream and material to be converted are mixed using an in-line mixer composed of catalytic metals and activated surfaces, modified activated surfaces, plated activated surfaces, laminates and coated surfaces that enhance the overall reaction. Yet alternatively, the blending of the impinging stream and material to be converted are mixed using a mixing chamber which consists of catalytic metal and metal oxide gauzes, sponges, impregnated porous materials and surface treated materials, activated surfaces, modified activated surfaces, plated activated surfaces, laminates and coated surfaces that enhance the overall reaction. Alternatively, the species created by the non-equilibrium non-thermal plasma are used to carry out the non-combustion and reactions and convert chemicals, byproducts, wastes of any kind, solvents, in-process unreacted materials and any carbonaceous materials to useful or benign products through the use of a stoichiometrically controlled gas-discharge-system or reactor to create pre-formed or in-situ formed singlet state species, reactive radicals and intermediates, ions, and excited state species to act on and break down the chemicals, byproducts, wastes of any kind, solvents, in-process unreacted materials and any carbonaceous materials in a second stoichiometrically controlled gas-discharge-system or reactor or an alternate region of a common gas-discharge-system or reactor.

In one implementation of the waste disposal system, both the primary and secondary reaction chambers comprise a non-steady-state discharge in a coaxial electrode system from a classical arc plasmatron. In such an implementation, no power is supplied to the chambers—the power is supplied to the plasma torch, which fires into the secondary chamber. In one implementation, the power supplied to either chamber is very low, with currents of between 0.001 and 10 amps. Alternatively, the power supplied to either chamber is very low, with currents of between 0.001 and 1 amps. Alternatively, the power supplied to either chamber is very low, with currents of between 0.001 and 0.1 amps. Yet alternatively, the power supplied to either chamber is very low, with potentials of between 0.1 and 200 kV. Alternatively, the power supplied to either chamber is very low, with potentials of between 1 and 30 kV. Alternatively, the power supplied to either chamber is very low, with potentials of between 5 and 15 kV.

In am implementation of the waste disposal system, the primary and secondary reactors are fitted with heat exchangers to the overall common or individual reactor design is optimized to facilitate energy management and capture.

The above specification, examples, and data provide a complete description of the structure and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:
1. A method comprising:
   generating a stream of free radicals using a low energy plasma torch generating cold plasma;
   injecting at least one of smoke, combustible gas, air, steam, and inert gas into a secondary chamber; and
   impinging the stream of free radicals on the flow of the at least one of smoke, combustible gas, air, steam, and inert gas, wherein the secondary chamber further comprises a catalyst to accelerate the reaction of the free radicals with the smoke.

2. The method of claim 1, wherein the smoke is generated from a pyrolysis chamber and has a heat value.

3. The method of claim 1, wherein the smoke is generated from solid waste product.

4. The method of claim 1, wherein the smoke comprises at least one of particles at molecular size and hydrocarbon components.

5. The method of claim 1, wherein the at least one of smoke, combustible gas, air, steam, and inert gas are inserted into the secondary chamber using a plurality of concentric pipes.

6. The method of claim 1, wherein the at least one of smoke, combustible gas, air, steam, and inert gas are inserted into the secondary chamber using a plurality of pipes at an angle to each other.

7. The method of claim 1, wherein the air is humid air at temperature below a dew point of the air.

8. A system for disposing waste, the system comprising:
a plasma igniter configured to create a stream of free radicals;
a means for generating smoke from solid waste, wherein the smoke having a heat value of at least one BTU/g; and
a chamber configured to inject smoke into the stream of free radicals, wherein the chamber further comprises a catalyst to accelerate the reaction of the free radicals with the smoke.

9. The system of claim 8, further comprising a plasma igniter is configured to operate at high voltage and low amperage.

10. The system of claim 8, further comprising a waste processor to generate the smoke from waste products.

11. The system of claim 8, wherein the chamber further comprises a plurality of pipes to inject at least one of air, steam, and inert gases.

12. The system of claim 11, wherein at least two or more of the pipes are concentric pipes.

13. The system of claim 8, wherein the chamber further comprises a catalyst screen to accelerate reaction of the free radicals with the smoke.

14. The system of claim 8, wherein the chamber further comprises at least one monitor to monitor output from the secondary chamber.

15. The system of claim 8, wherein the chamber further comprises at least one monitor to monitor operating parameters of the secondary chamber.

16. The system of claim 8, wherein the smoke is received from a refinery.

17. The system of claim 8, wherein the smoke is generated from hospital waste products.

18. A method comprising:
generating a stream of free radicals using at least one of a plasma torch and a plasma igniter;
injecting smoke generated from at least one of waste chemical, liquid waste, processing byproducts, gasses, vapors, and fuel streams into the stream of free radicals; and
accelerating reaction of the smoke with the stream of free radicals using catalyst in a secondary chamber.

19. The system of claim 18, wherein the smoke has a heat value of in a range of one BTU/g to one hundred BTU/g.

* * * * *